INVENTOR.
S.W. FREEMAN
BY Forest B. Hitchcock
HIS ATTORNEY

INVENTOR.
S.W. FREEMAN
BY
Forest B. Hitchcock
HIS ATTORNEY

United States Patent Office 3,337,727
Patented Aug. 22, 1967

3,337,727
VEHICLE CONTROL SYSTEMS
Sydney W. Freeman, Rochester, N.Y., assignor to General Signal Corporation, Rochester, N.Y., a corporation of New York
Filed Dec. 16, 1963, Ser. No. 330,764
3 Claims. (Cl. 246—63)

Generally speaking, the present invention relates to systems for controlling vehicle traffic along a right of way, and more particularly pertains to a system for controlling a railway type vehicle to operate in accordance with a control message communicated to the vehicle as indication of the distance, spacing or headway to the preceding vehicle. This invention provides improvements in the vehicle control system of the Wilcox application of common ownership Ser. No. 221,553, filed Sept. 5, 1962, and no claim is made herein to subject matter claimed in that application.

More specifically, it is proposed in accordance with the present invention to provide communication means partly on the wayside and partly on the railway vehicle being controlled effective to communicate a control message to such railway vehicle, containing a plurality of different signal frequencies; the number of which varies proportionately with the spacing between it and the preceding train or vehicle. This communicated control message is then effective on the vehicle to govern the proper or desired performance of the vehicle, through the medium of cab signalling, conventional train control, or fully automatic train operation (without operator).

In order to insure safe operation of a particular vehicle being controlled, and, to prevent erroneous control due to any frequency signals received from extraneous wayside sources, it is further proposed in accordance with the present invention to provide means for checking the integrity of each signal frequency contained in the vehicle control message communicated from the wayside to the vehicle, before such frequency (portion of the control message) will be considered valid for vehicle control purposes. In the embodiments of the present invention to be described hereinafter, this integrity check is accomplished by requiring that each different signal frequency comprising the control message be coded at a predetermined rate before that frequency will be considered, on the vehicle, as valid.

In describing the present invention in detail, two different embodiments will be discussed, each concerned with the control of railway vehicle traffic on a stretch of railway track. For example, the type of control system provided is especially suitable for controlling the operation of rapid transit type railway vehicles, particularly in view of the close headway often desired. However, it is to be understood at this time that the control system of the present invention is not intended to be limited to railway vehicle control, but, is suitable for controlling different types of vehicles on different types of rights of way.

In the first embodiment disclosed herein, the right of way over which the railway vehicles are controlled is divided into insulated track sections, and, advantage is taken of the coded track circuit (braking distance in length) as a relatively simple, yet reliable means of detecting that there is at least this braking distance clear in front of a train being controlled, so that the train may then proceed at the maximum speed. Additionally, means are provided for controlling a particular vehicle in accordance with a more exact indication of the actual distance or spacing to the preceding train (number of signal frequencies received in a control message communicated thereto) whenever such vehicles occupy adjacent track sections, so that the second or following vehicle may, for example, be accelerated if the spacing between the vehicles has increased sufficiently, even though the trains are on adjacent track sections. In this manner, the control system is able to maintain the required safe headway (braking distance plus safety margin) for the following vehicle without the undesirable delay of having to wait until the preceding vehicle completely clears the track section in advance, as might be experienced if only the insulated track sections provide spacing or distance indication.

In the second embodiment of the present invention disclosed herein, the control message communicated to a vehicle concerning the distance or spacing to the preceding train is again in the form of a control message containing a plurality of signal frequencies, the number of which is indication of whether or not the vehicle has at least required braking distance clear in front of it, so that it may travel at maximum speed. Thus, this second embodiment also makes use of the train rails for communicating the control message from the wayside to the vehicle, but, does not require the use of insulated track sections and therefore might have particular utility on an electrified railroad where such insulated sections are sometimes undesirable.

More specifically, the control system according to the second embodiment includes transmitters of different carrier frequencies disposed along the trackway to apply their respective frequencies at predetermined points spaced such that the control message received by a vehicle will always contain at least a predetermined number of different carrier frequencies, if there is safe braking distance between the train being controlled and the preceding train, for the existing maximum permitted speed. Here again, means are provided for checking the integrity of each carrier frequency received on the vehicle being controlled so that only valid signals (coded at a predetermined rate) from the spaced wayside transmitter will be effective on the vehicle, so as to insure against faulty control by signals from extraneous sources.

In addition to the clear braking distance indication provided by the number of carrier frequencies contained in this control message, means are provided for also instructing the vehicle of its exact desired speed for each portion of the right of way, including apparatus effective to modulate the carrier frequency control message with predetermined tone frequencies. Furthermore, apparatus is provided on the vehicle effective to interpret the received control message and permit it to exercise control over the vehicle at this desired speed only provided that the message contains the proper number of carrier frequencies, the proper tone modulations, and the proper rate coding, and, to insure that only one vehicle receives and is controlled by a given tone modulated control message, the wayside apparatus comprising this second embodiment is circuited in such a way that only the carrier frequency from the transmitter means immediately in advance of the vehicle being controlled is modulated with the desired speed indication tone frequencies.

In view of the above discussion, one object of the present invention is the provision of a simple, yet failsafe system for controlling vehicle traffic particularly when the vehicles are desired to operate with a minimum, yet safe, spacing or headway between them.

Another object of the present invention is to provide indication to a vehicle being controlled concerning the spacing or headway between it and the preceding vehicle, in accordance with a control message communicated to the vehicle containing a plurality of signal frequencies, the number of which is in proportion to the spacing between the vehicles.

A further object of the present invention is to provide for checking the portion or integrity of each frequency signal contained in the control message, so as to prevent, for example, faulty control of the vehicle due to extraneous or invalid signal frequencies received on the vehicle.

Another object of the present invention is to provide a simple, yet safe system of controlling railway vehicle traffic on a stretch of railway track, wherein close, but proper, headway is maintained between vehicles, with or without utilizing insulated track section.

A more specific object of the present invention is the provision of a railway vehicle control system wherein the following of two vehicles is controlled to travel at a maximum predetermined speed as long as there is at least one clear track section (braking distance in length) between it and the preceding vehicle, and is subsequently controlled in accordance with a more exact indication of the spacing to the preceding vehicle when they occupy adjacent track sections.

Other objects, purposes and characteristic features of the present invention will be pointed out as the description of the invention progresses and in part be obvious from the accompanying drawings, in which.

In order to simplify the illustrations of the drawings and to facilitate in the disclosure of this invention, various conventional circuit symbols have been employed in the drawings. For example, the symbols (+) and (−) are intended here to represent the opposite terminals of a suitable source of direct current, whereas, the symbols BX and NX are intended to represent the opposite terminals of a suitable source of alternating current having a frequency such as 100 cycles per second, for example.

Figure 1:
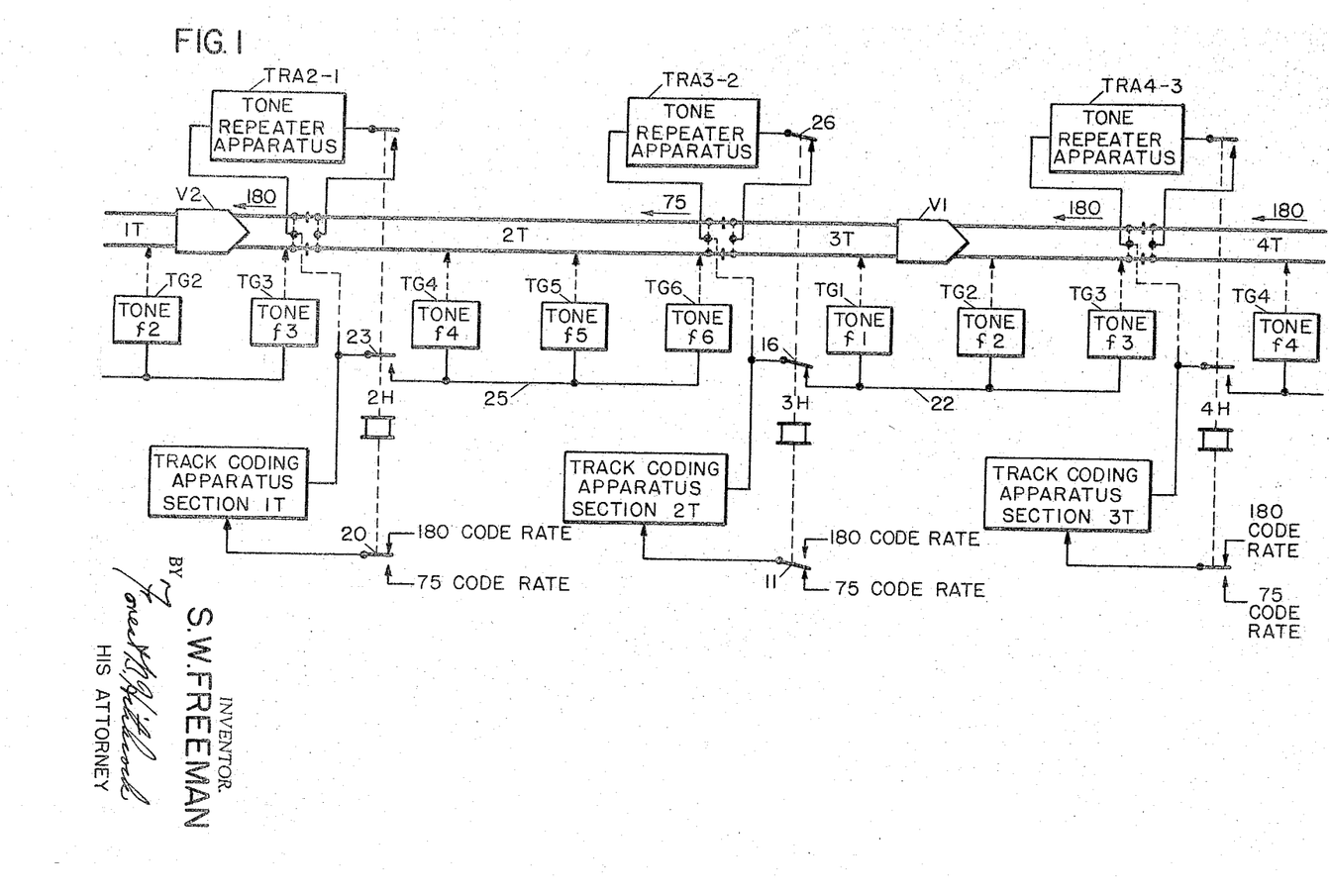
FIG. 1 illustrates diagrammatically the overall system forming a first embodiment of the present invention, as applied to a stretch of railway track divided into insulated track sections.

With reference now to FIG. 1 of the accompanying drawings, the first embodiment of the vehicle control system proposed in accordance with the present invention is utilized for controlling railway vehicle traffic along a stretch of track divided into insulated track sections 1T, 2T, 3T and 4T.

*Wayside apparatus*

Associated with each of these insulated track sections is suitable Track Coding Apparatus effective to apply predetermined code rates to the rails of the associated track section in accordance with the desired operation of railway vehicles along the stretch of track. More particularly, it will be noted in FIG. 1 that the track code rates are transmitted from right to left through each track section; i.e., the illustrated stretch of trackway is signalled for traffic flowing in the eastwardly direction, from left to right in the drawing. A conventional track detector relay H is provided for each of the insulated track sections, and, is utilized for selecting the code rate to be applied to the next track section to the rear (to the left); i.e., each track section is coded in accordance with traffic conditions in advance.

A plurality of tone generators TG are spaced along each of the track sections and are utilized, as will be described in detail hereinafter, to provide indication to one vehicle of the exact spacing or headway between it and the preceding vehicle, when the vehicles occupy adjacent track sections. In the drawings, for example, six tone generators, each having a different output frequency, are illustrated as being provided along each adjoining pair of insulated track sections. More particularly, tone generators TG4, TG5 and TG6 are disposed on the wayside at evenly spaced points along the track section 2T, whereas, tone generators TG1, TG2 and TG3 are spaced at corresponding points along the next track section 3T in advance. Track section 1T would be equipped with the same tone generators as track section 3T, while the next track section to the right of section 3T (section 4T) would be equipped with tone generators TG4, TG5 and TG6. Each of these tone generators TG1 through TG6 generates an associated output frequency $f1$ through $f6$ respectively.

Suitable tone repeating apparatus TRA is employed on the wayside, at the junction of adjacent track sections for the purpose of repeating the tone frequencies from one track section into the next track section to the west or left, under certain traffic conditions to be discussed. For example, the apparatus for repeating tones between track sections 3T and 2T is designated by the reference character TRA-2.

The conventional track coding apparatus provided on the wayside, for each track section, includes code transmitters 180CT and 75CT (see FIG. 2) which continually generate 180 and 75 code rates respectively, and, code repeater relays CP which selectively apply these code rates at the right-hand or exit end of the track sections, in accordance with the existing traffic conditions in advance. Connected at the left-hand or entrance end of each track section is a code responsive track relay TR which receives the code applied by the relay CP at the opposite end of the section, as long as the section is unoccupied, and, which controls the conventional track detector relay H in such a manner that the detector relay is picked up as long as the associated relay TR is energized at either a 75 or 180 code rate.

*Train carried apparatus*

Figure 3:
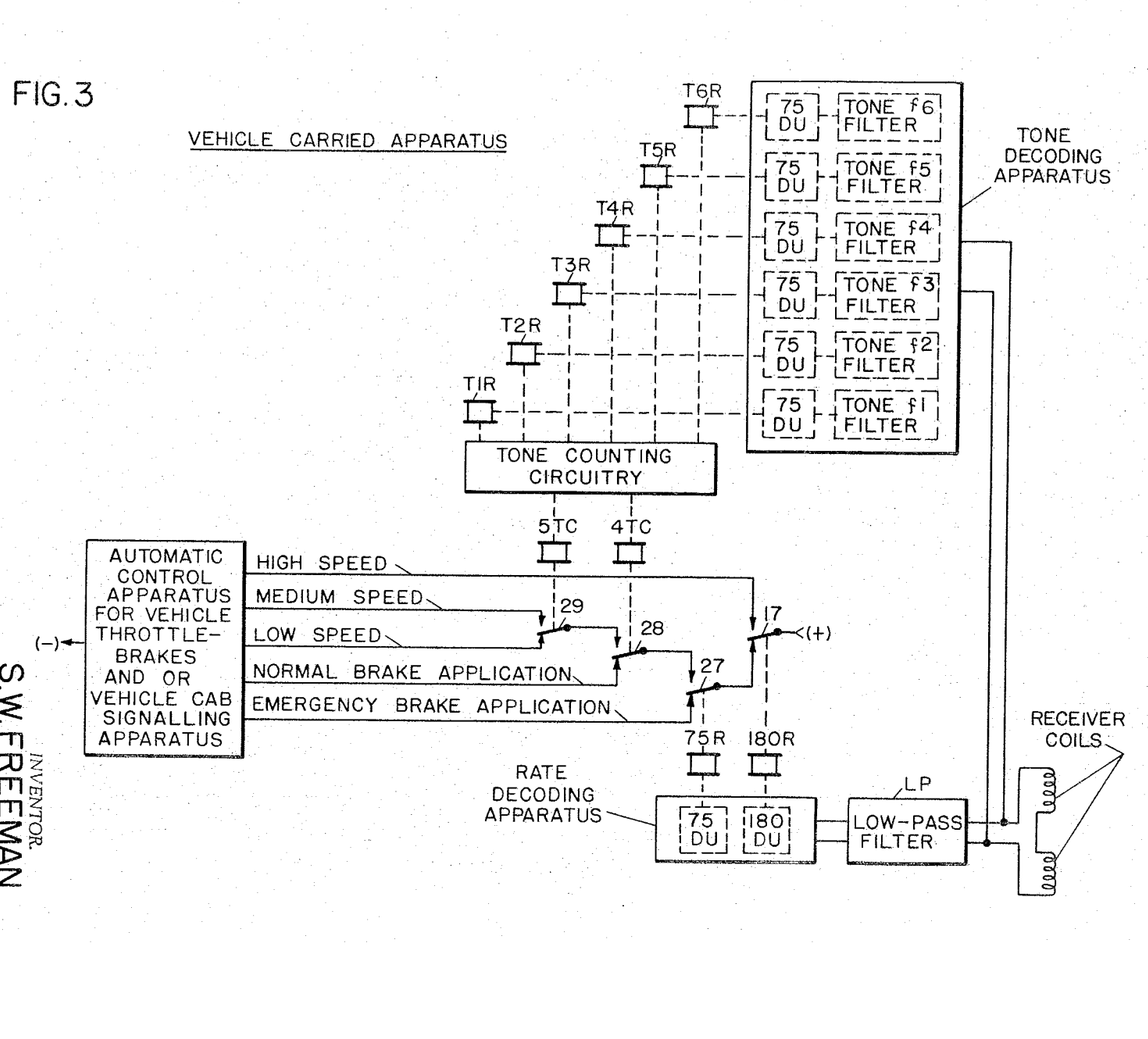
FIG. 3 is a block diagram illustrating the vehicle carried apparatus included in this first embodiment of the present invention.

With reference to FIG. 3, each railway vehicle being controlled in accordance with this first illustrated embodiment of the present invention is provided with suitable receiver coils on its leading end effective to inductively receive any track code rates and tone frequencies applied to the rails of the section occupied by the vehicle. The received track code rate information is passed by a low-pass filter LP (effective to block the tone frequencies) and is then decoded by suitable Rate Decoding Apparatus, including decoding units 75DU and 180DU, to cause selective pick up of decoding relays 75R and 180R, when 75 and 180 code rates respectively are received from the wayside.

Similarly, suitable Tone Decoding Apparatus is also provided on the vehicle, including a plurality of filters each effective to pass only one of the tone frequencies, which are further effective to cause tone registering relays T1R through T6R to become selectively picked up in accordance with the particular tone frequencies being received by the vehicle and passed by the tone filters. To prevent faulty operation due to noise or other extraneous signals, the validity of each tone frequency received is checked by inserting a 75 rate decoding unit 75DU between each of the tone filters and the associated output tone registering relay (T1R, T2R, etc.). Thus, only the tone frequencies that are properly coded (when transmitted from the wayside) will be considered valid and permitted to exercise vehicle control, in accordance with the picking up of the tone registering relays T1R through T6R.

More particularly, the registration provided by these tone registering relays T1R through T6R controls suitable Tone Counting Circuitry so as to cause relay 5TC to be picked up as long as at least five different valid tone frequencies are being received on the vehicle, and, relay 4TC to be picked up as long as at least four different valid tones are being received. Tone count relays 5TC and 4TC, together with the decoding relays 75R and 180R, are then connected in the train carried circuitry to cause selective energization of a plurality of train control wires which lead to and control the vehicle throttle and brakes by means of suitable automation apparatus and/or control conventional cab signalling apparatus, as desired.

Operation

Figure 2:
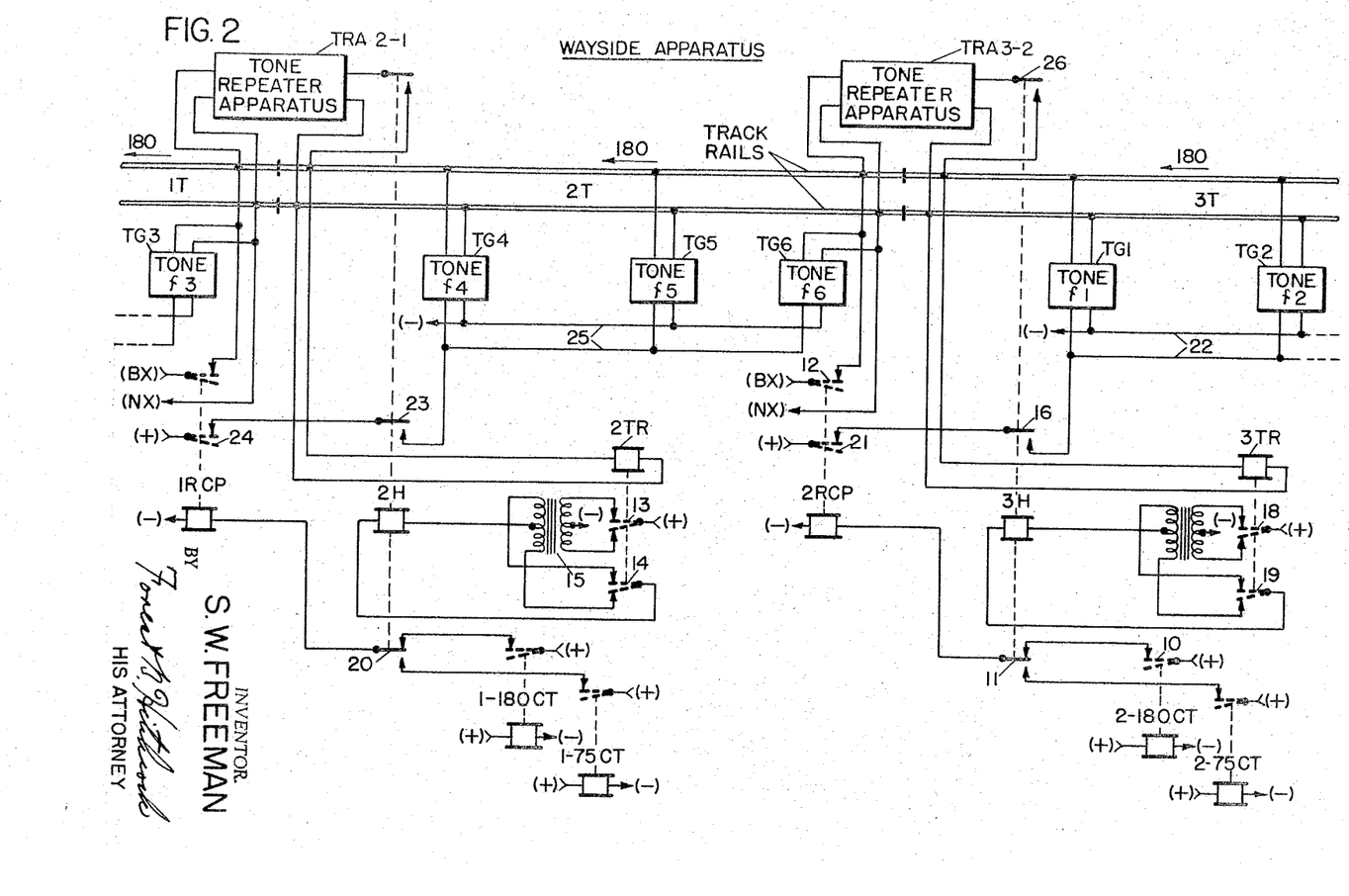
FIG. 2 shows, in somewhat more detail, the circuitry employed on the wayside in accordance with this first embodiment shown in FIG. 1; and more specifically shows the operating condition of the circuitry when no vehicles are present.

Assuming initially that the illustrated stretch of track in FIG. 2 is unoccupied (as shown), the code repeater relay CP at the right-hand end of each track section is energized from the associated code transmitter 180CT, and causes a 180 code rate to be applied to the right-hand end of each track section. Therefore, the code responsive track relays TR at the opposite track section ends are each operated at the 180 rate so that each of the track detector relays H are picked up, as illustrated. For example, with no vehicle occupying section 3T, code repeater relay 2RCP is energized at a 180 code rate by a circuit extending from (+), through front contact 10 of code transmitter 2–180CT, front contact 11 of track detector relay 3H, and to (−). Consequently, the relay 2RCP operates its contact 12 to intermittently connect the source of alternating current represented by he symbols BX and NX to the right-hand end of section 2T, at this 180 code rate. As a result, track relay 2TR is energized at this same code rate, to operate its contacts 13 and 14, and thereby causes detector relay 2H to be picked up through the medium of a conventional decoding transformer 15. This picking up of relay 2H in turn causes code repeater relay 1RCP to also be energized at the 180 code rate. Under these assumed unoccupied traffic conditions of FIG. 2, no tones are applied anywhere along the illustrated track stretch, since all of the detector relays H are at this time picked up, as shown.

If it is now assumed that a first railway vehicle V1 is occupying track section 3T, as illustrated in the accompanying FIG. 1, the track detector relay 3H will be in its dropped away position to: (1) close its back contact 11 and cause the Track Coding Apparatus for section 2T to apply a 75 code rate to the right-hand end of this track section 2T; and (2) close its back contact 16 to cause tones *f*1, *f*2 and *f*3 to be intermittently applied to the rails of section 3T at this same 75 rate. However, since clear traffic conditions are assumed to exist in advance of the vehicle V1 on track section 3T, this vehicle would also be receiving a 180 code rate applied at the right-hand or exit end of track section 3T to thereby cause pick up of the vehicle carried decoding relay 180R on this first vehicle (see FIG. 3), so that such vehicle would ignore any received tones, in accordance with the closing of front contact 17 of relay 180R and the resulting energization of the HIGH SPEED control wire shown in FIG. 3 instructing the vehicle V1 to proceed at its nominal high speed.

More specifically and with reference to the more detailed circuitry of FIG. 2, the presence of the assumed vehicle V1 on track section 3T would cause track relay 3TR to be deenergized, so that its contacts 18 and 19 are not operated, and detector relay 3H is therefore dropped away. As a result, the code repeater relay 3RCP is energized, over back contact 11 of relay 3H, at a 75 code rate and accordingly operates its own front contact 12 to apply this lower code rate to the rails of section 2T. This 75 code rate energization of track section 2T and track relay 2TR causes detector relay 2H to remain in its picked up position (front contact 20 closed) for maintaining the 180 code rate application to the next track section 1T. Furthermore, since back contact 16 of detector relay 3H is now closed, in FIG. 2, the operation of front contact 21 of relay 2RCP at the 75 rate and the resulting intermittent energization of line wires 22 causes the tone generators (TG1, TG2 and TG3) disposed along track section 3T to intermittently apply their respective output tone frequencies *f*1, *f*2 and *f*3 to the rails of section 3T, at this same 75 code rate. As previously pointed out, these tone frequencies do not, at this time, produce any control over the vehicle V1, since it is also receiving a 180 code rate.

Assume now that, with this first vehicle V1 located between tone generators TG1 and TG2 on section 3T, a following or second vehicle V2 enters at the left-hand end of track section 2T (see FIG. 1). Detector relay 2H would now be released to close its back contact 20 and 23, and therefore tones *f*4 through *f*6 (coded at the 75 code rate over front contact 24 of relay 1RCP and line wires 25) would also be applied at their respective application points to rails of track section 2T. Furthermore, because of the location of the preceding or leading vehicle V1 between generators TG1 and TG2, the tone frequency signals from generators TG2 and TG3 are prevented (by the train shunt) from reaching the left-hand or entrance end of section 3T, and therefore, only coded-tone frequency *f*1 would be repeated from track section 3T into track section 2T by the Tone Repeating Apparatus TRA3-2 located between sections 2T and 3T and including the now closed back contact 26 of relay 3H.

Four tones (*f*1, *f*4, *f*5 and *f*6) would thus now be received on the following vehicle V2, and (referring to FIG. 3) after each tone is selectively passed by the appropriate tone filter, and, after its integrity is checked by the appropriate decoding unit 75DU at the output of the tone filter, the registering relays T1R, T4R, T5R and T6R would be energized to, in turn, cause code counting relay 4T to be picked up to register that four different valid tone frequencies are being received. The LOW SPEED control wire would consequently be energized over a circuit including back contact 17 of relay 180R, front contact 27 of relay 5TC, to call for speed reduction on the following train or vehicle V2 from its nominal high speed to its nominal low speed, either by means of indication given to the engineman by suitable cab signalling or by automatic operation of the vehicle throttle and/or brakes.

If, because of the speed reduction on the following train V2, the preceding train V1 uncovers tone generator TG2 before the following train passes TG4, it would thereby cause five distinct valid tones (*f*1, *f*2, *f*4, *f*5 and *f*6) to be received on the following train, and, tone count relay 5TC would also become picked up to cause energization of the MEDIUM SPEED control wire in FIG. 3 over front contact 29 of relay 5TC, so as to register that the second train may now be accelerated, either manually or automatically. However, if this second train V2 should then move to the right of tone generator TG4 and thereby cause only four tones (*f*1, *f*2, *f*5 and *f*6) to again be received, the relay 5TC would drop away to open its front contact 29 and the following train would thus be controlled once again to its nominal low speed.

As previously discussed, each of the insulated track sections 1T, 2T, etc. is braking distance in length; i.e. if at any time only three or less tones should be received on the following train V2 (indicating that it is getting too close to the leading train V1), the relays 4T and 5T would both be dropped away and cause energization of the NORMAL BRAKE APPLICATION control wire, over back contact 28 of relay 4TC, to register that a service brake application is in order. Furthermore, if at any time both the 75 and 180 code rates are simultaneously absent on a train or vehicle (indicating a broken rail, for example), the EMERGENCY BRAKE APPLICATION control wire is energized over back contacts 17 and 27 of relays 180R and 75R respectively, to stop the vehicle.

It should furthermore be understood at this time that three different tone generators have been utilized for each illustrated track section merely for the purposes of this disclosure, and, that both more or less frequencies could be employed, per track section, depending upon the fineness of control desired in actual practice, without in any manner departing from the spirit or scope of the present invention.

From the above discussion and with reference to FIGS. 1 through 3, it should thus be noted that a train with at least one clear track section (braking distance in length) between it and the preceding train will be receiving a 180 track code, instructing it to proceed at its maximum permissible high speed; and, that if a train should enter the track section just behind an occupied section, the following vehicle is controlled in accordance with its exact positioning relative to the preceding vehicle on the right of way, as detected by the number of valid tones received aboard the second or following vehicle. In this manner, the railway vehicles being controlled are provided with a distinctive indication concerning the exact spacing to a preceding vehicle in an adjacent track section which thus permits such vehicles to maintain closer headway between one another, while at the same time taking advantage of the good shunting sensitivity, improved broken-rail detection, etc. provided by the coded track circuit. Utilizing the system of the present invention, railway trains are thus safely controlled to operate with close minimum headway, thus avoiding the unnecessary delays heretofore experienced in control systems employing insulated track sections when one vehicle was required to wait until a preceding train was completely clear of the next track section in advance, before this following train could be accelerated.

The second embodiment of the present invention illustrated in the drawings FIGS. 4 through 7 also provides for controlling railway vehicles in accordance with the number of different frequencies in a control message communicated via the track rails, for example, from the wayside to the vehicle as indication of the separation or spacing to the preceding vehicle. However, this second embodiment proposes to provide this headway control for such railway vehicles without requiring the use of insulated track sections; i.e. insulated joints or the like are not employed, and therefore, this second embodiment would have particular utility on electrified railways.

Figure 4A:
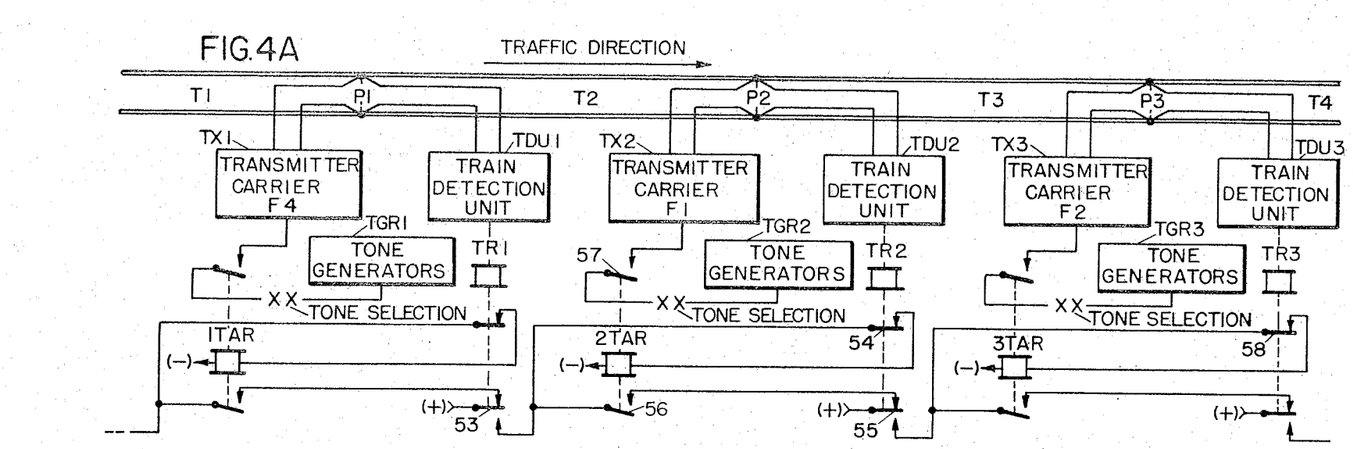
FIGS. 4A and 4B, when placed side by side with FIG. 4A on the left, show the details of a second embodiment of the present invention as applied to a stretch of railway track without insulated track sections.
Figure 4B:
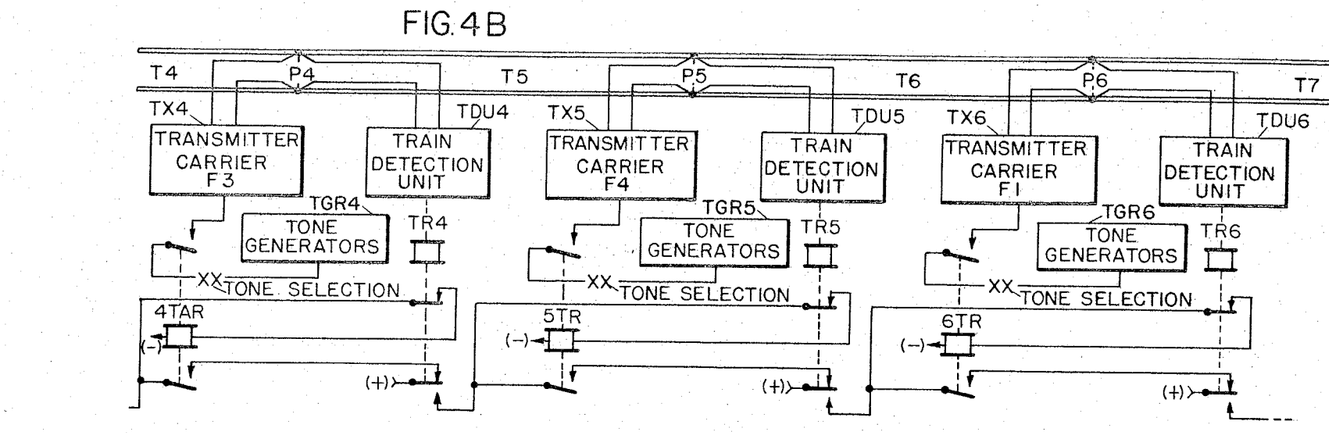

In FIGS. 4A and 4B, more specifically, a partial stretch of railway track is illustrated with transmitters TX of predetermined carrier frequencies spaced therealong at location points P1, P2, P3, P4, P5, etc., together with a suitable train detection unit TDU. These transmitters TX each generated an associated one of the carrier frequencies F1 through F4 (as designated in the drawings), and are disposed in such sequence that the frequencies F1 through F4 are transmitted at successive points along the wayside, in repeating sequence F1, F2, F3, F4, F1, F2, etc. Furthermore, each of the train detection units TDU, disposed at these spaced transmitting location points P is rendered responsive to the frequency of the associated transmitter at that location and includes a detector relay TR which is normally picked up as long as the detecting unit is receiving energy from the associated transmitter, and, which becomes dropped away when the associated transmitter is shunted by the wheels of a vehicle; i.e. when a vehicle is passing that location point.

In accordance with this second embodiment of the present invention, these wayside transmitter location points are spaced to form successive zones or blocks T1, T2, T3, etc. of predetermined length along the right of way, and, the vehicle being controlled therefore simultaneously receives a certain number of different carrier frequencies dependent upon the number of clear zones or blocks ahead. For example, the spacing between adjacent transmitter units might be made equal to one half of the braking distance required for maximum allowable speed on the particular section of right of way, so that the system would thus permit a vehicle being controlled to operate at this maximum speed as long as at least three valid carrier frequencies are received on the vehicle.

According to this second embodiment of the present invention, apparatus is furthermore provided for tone modulating the carrier frequency control message communicated to the vehicle in accordance with the speed (which may be less than maximum allowable speed) at which the vehicle is desired to travel over the associated section of the right of way. To insure that only the proper vehicle will receive the tone modulated control message, the wayside is circuited such that only the carrier frequency transmitted by the transmitter TX immediately in advance of the controlled vehicle will be tone modulated. Obviously, this will minimize the possibility of a vehicle receiving the wrong control message; i.e. in this manner, as the vehicle progresses along the illustrated right of way, of FIGS. 4A and 4B, the carrier frequency transmitters TX1 through TX6 would be successively modulated with the tone frequencies generated by the associated tone generators TGR1 through TGR6. More specifically, the carrier frequency at a given transmitter location is tone modulated only when the associated tone applying relay TAR for that location is picked up, as will be described. For the purpose of simplifying the drawings, it is intended here that the symbols (XX) represent any required selection of the particular tone modulating frequencies at each location, for example, in accordance with the particular desired vehicle speed at that location, as previously discussed. Obviously, this selection could be accomplished in any desired manner, for example, by controls communicated from a remote central office (not shown).

Figure 5:
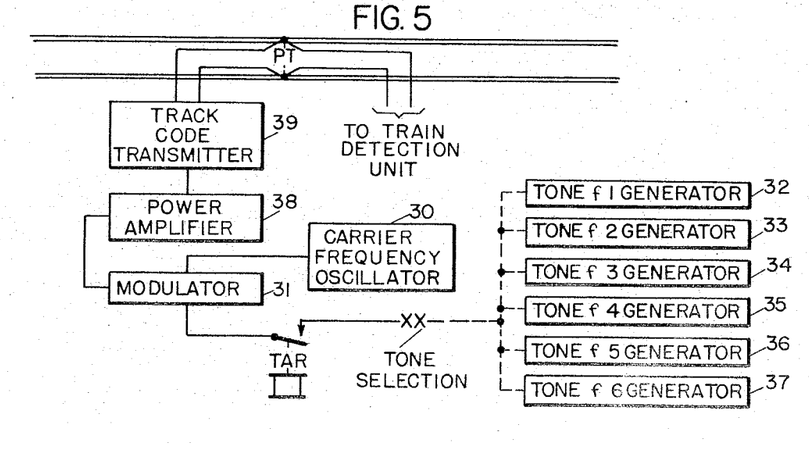
FIG. 5 shows a typical transmitting location according to this second embodiment of the present invention.

With reference now to FIG. 5 of the accompanying drawings, a typical transmitting location point PT is illustrated in somewhat more detail and is equipped with apparatus including: a carrier frequency oscillator 30 preset to generate the particular carrier frequency to be associated with the particular transmiting location; a modulator unit 31 for at times (when relay TAR in FIG. 5 is picked up) modulating the carrier frequency output of oscillator 30 with certain of the tones generated by generators 32 through 37 in accordance with the particular desired speed adjacent this transmitting location; a power amplifier 38; and, a track code transmitter 39 preset to cause application of the carrier frequency signal, whether modulated or unmodulated, to the track rails at a predetermined code rate, and in accordance with which the integrity or validity of each carrier frequency signal contained in the control message received on the vehicle being controlled can be checked in substantially the same manner as that previously considered when discussing the first embodiment of the present invention.

Figure 7:
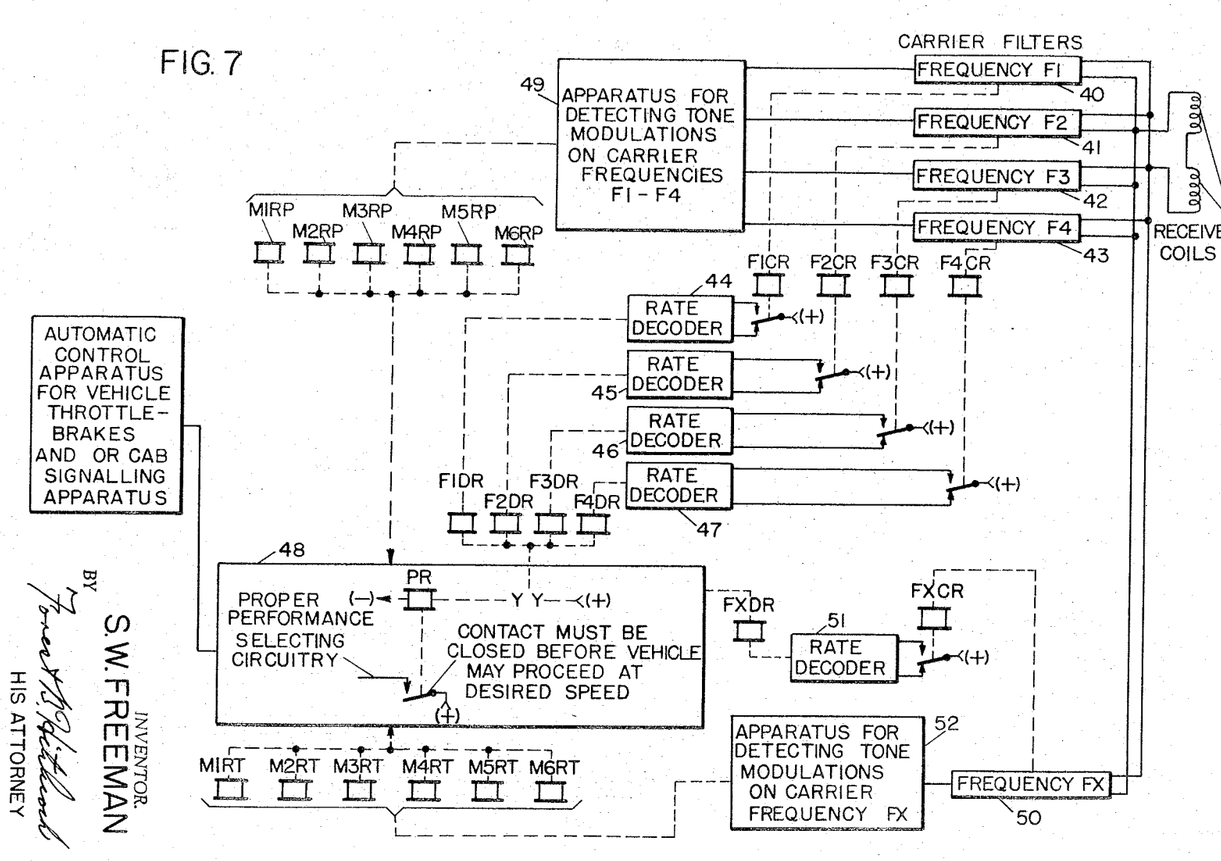
FIG. 7 illustrates, in simplified block diagram form, the train carried apparatus provided in the second embodiment of the present invention.

The train carried apparatus employed in accordance with this second embodiment of the present invention is illustrated in FIG. 7 and also includes receiver coils assumed to be mounted on the leading end of the vehicle to inductively pick up the control message from the track rails. The received control message is then supplied as inputs to a plurality of carrier frequency filters 40 through 43, one for each carrier frequency employed, and, at the output of each of the carrier filters is an associated carrier relay (F1CR, F2CR, etc.) which is operated in accordance with the predetermined code rate at which the associated carrier frequency is being received from the track rails; e.g. if carrier frequency F1 (coded at a 75 pulse per minute code rate) were being received on the vehicle, the carrier relay F1CR in FIG. 7 would be intermittently picked up and released at this same code rate.

In FIG. 7, the carrier relays F1CR through F4CR operate rate decoder units 44 through 47 and thereby cause selective pick up of associated decoding relays F1DR through F4DR in accordance with the particular carrier frequencies F1 through F4 that are received aboard the vehicle at the proper code rate. As illustrated in FIG. 7, the symbol (YY) in the energizing circuit for the illustrated relay PR is intended here to represent that at least three of the relays F1DR through F4DR must be picked up, to indicate that at least three different valid carrier frequencies are being received, before the relay PR can be energized to close its illustrated front contact and thereby permit the vehicle being controlled to travel at its desired speed. Thus, the relay PR can be thought of as a proceed control relay which must be picked up before the vehicle may proceed and is assumed here to be included in any suitable type of circuitry for selecting the proper performance of the vehicle being controlled in accordance with the spacing or headway to the next preceding vehicle. As illustrated in FIG. 7, this selecting circuitry is designated by the reference numeral 48 and is utilized to provide input to suitable automatic control apparatus for automatically operating the vehicle throttle and/or brakes, or for controlling conventional cab signalling apparatus.

At the output of each of the carrier frequency filters shown in FIG. 7 is suitable tone detecting apparatus 49 for detecting the particular tone modulations contained in the control message comprising the carrier frequencies F1 through F4. This detecting apparatus 49 controls certain output relays M1RP through M6RP to register the particular tone modulations received on the carrier frequency transmitted from the location point immediately in advance of the vehicle being controlled, as indication of the desired or proper speed for the vehicle. This selection of desired vehicle speed, by the tone relays M1RP through M6RP, is indicated in FIG. 7 by the dotted line leading to the proper performance selecting circuitry 48.

As will be pointed out in more detail hereinafter, another carrier frequency FX is provided and is utilized under certain conditions, in this second embodiment of the present invention, to provide special instructions to the vehicle concerning, for example, any restricted speed movements on the stretch of the right of way shown in FIGS. 4A and 4B. Accordingly, a carrier filter 50 is provided on the vehicle (see FIG. 7) and is effective to register when this carrier frequency FX is received on the vehicle, and, controls output relay FXCR which, in turn, operates through a rate decoder 51 to pick up relay FXDR as long as this particular carrier frequency is valid; i.e. is coded at the proper rate. The particular vehicle speed being called for by carrier frequency FX is detected by detecting apparatus 52 which also receives the output from the carrier filter 50 and which operates tone relays M1RT through M6RT to register this desired speed, in accordance with the particular tone modulations received along with this carrier frequency FX.

It should be pointed out at this time, that the carrier frequency FX is utilized, for example, as will be described, where restrictive speed is to be enforced on the vehicle, and, is entirely independent of the carrier frequency control utilized to maintain proper headway or separation between vehicles; i.e. only the carrier frequencies F1 through F4 are utilized to instruct the vehicle of the distance to the next vehicle in advance, and therefore, may be considered as separation carrier frequencies F1 through F4, so as to distinguish them from the frequency FX which is employed merely to communicate special controls or instructions to the vehicle at certain locations along the right of way.

In view of the foregoing discussions, it will be seen that in the second embodiment of the present invention, a vehicle being controlled may proceed at desired speed only if three conditions are satisfied aboard the vehicle; i.e. (1) the vehicle is receiving at least three different separation carrier frequencies, (2) all carrier frequency information received must be coded at the proper rate, and (3) the proper tone modulations must be received along with one of the carrier frequencies, to request the desired vehicle speed. It is intended here that if any of these operating conditions are not satisfied, the vehicle being controlled will be placed in a restricted operating condition, such as, for example, be brought to immediate stop.

To describe in more detail how this desired speed running information is communicated between the wayside and the vehicle, assume the presence of a first train in the right of way block represented by the reference character T2 in FIG. 4A. If no other trains are present on the stretch of track illustrated in FIGS. 4A and 4B, this train will be receiving coded carrier frequency F1 from the carrier transmitter TX2 at the exit or right-hand end of block T2, coded carrier frequency F2 from the transmitter TX3 at the exit end of block T3, coded carrier frequency F3 from the transmitter TX4 at the exit end of block T4 (see FIG. 4B), and, coded carrier frequency F3 transmitted by transmitter TX5 at the exit end of block T5; i.e. the vehicle is receiving four valid carrier frequency signals instructing it that more than sufficient braking distance exists in advance, so that such vehicle may operate at any desired speed (below maximum allowable speed) as called for by the received tone modulated carrier frequency control message.

As previously pointed out, each of the train detection units TDU disposed at the spaced wayside points P in FIGS. 4A and 4B is responsive to the carrier frequency energy transmitted by the associated transmitter TX located at that wayside point, and includes a relay TR which is normally picked up (as shown) until a vehicle passes, at which time the track rail shunting effect of the passing vehicle causes the detecting relay TR to be dropped away. Accordingly, and with reference to FIG. 4A; in passing the location point P1 between blocks T1 and T2, the train now assumed to be occupying block T2 would have actuated the train detection unit TDU1 and caused dropaway of detector of relay TR1, to thereby complete an energizing circuit for relay 2TAR extending from (+), over back contact 53 of relay TR1, front contact 54 of relay TR2, and to (−). Subsequently, after the rear or trailing end of this assumed vehicle has passed location point P1 so that detector relay TR1 is returned to its normal picked up position, the relay 2TAR is maintained by a stick circuit including front contact 55 of relay TR2, its own front contact 56, and front contact 54 of relay TR2; i.e. the relay 2TAR remains in its picked up position until dropaway of relay TR2, as will be described. With front contact 57 of relay 2TAR now closed, the coded carrier frequency F1 being applied to the track rails at point P2 is also now modulated by predetermined tones from the tone generating apparatus TGR2, to thereby instruct the vehicle in block T2 of its desired speed for this section of the right of way, which information is utilized aboard the vehicle, as previously described, to cause operation of the vehicle at the desired speed, by controlling suitable cab signals, automatic train operating apparatus, or the like.

Returning to FIG. 4A, when the vehicle reaches the location point P2, at which transmitter TX2 is connected across the track rails, its presence as it passes into block T3 shunts transmitter TX2 and causes dropaway of detector relay TR2 which, in turn, opens its front contacts 54 and 55, and, thereby causes dropaway of relay 2TAR (to remove the tone modulations from carrier frequency F1). Furthermore, the resulting closure of back contact 55 of relay TR2 completes the energizing circuit for relay 3TAR (including front contact 58 of relay TR3), so that the carrier frequency F2 is now modulated with the predetermined tones, in accordance with the desired vehicle speed in block T3. Obviously, this may or may not be the same as the desired speed in the previous block T2. In this manner, only the carrier frequency transmitted from immediately in advance of the vehicle being controlled is tone modulated, so as to minimize the chances of the wrong vehicle receiving the control message, for example, as might otherwise occur particularly in track layouts where the stretches of track run parallel, and very near to one another.

Figure 6:
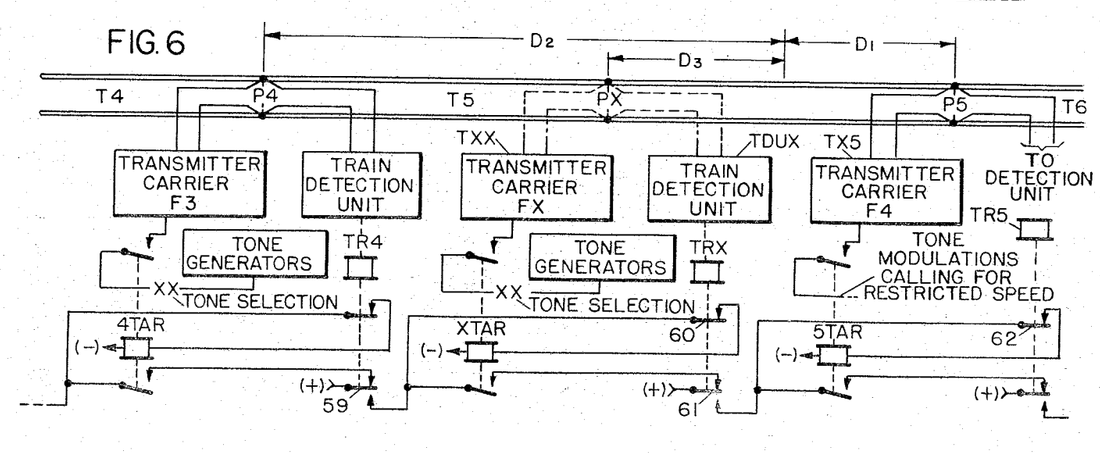
FIG. 6 shows, in somewhat more detail, the wayside apparatus provided in accordance with the second embodiment of the present invention for restricting the speed of the vehicle being controlled at a predetermined wayside location.

At certain locations along the right of way, it may be necessary or desirable to cause a vehicle being controlled to temporarily slow down to a predetermined restricted speed, over a distance less than exiting block length. Referring now to FIG. 6 of the accompanying drawings, the apparatus required on the wayside to execute this slow order is illustrated, and, includes a temporary transmitting location point PX (represented by the dotted lines) inserted within the normal block T5, at which transmitter TXX, of carrier FX, is located along with train detection unit TDUX, including relay TRX.

More specifically, it will be assumed here that the restricted or slow order speed is to be enforced for the distance D1 along the block T5, and, that a vehicle operating at the entering speed being called for by the tone modulated carrier frequency F3 requires a braking distance D3 in order to slow down to the restricted speed required at zone D1. Accordingly, the carrier frequency FX is tone modulated to call for the same desired speed as that called for in block T4, and, the transmitting location point PX, would be displaced from the right-hand or exit end of the block T5 by a total distance equal to the sum of distances D1 and D2. The distance referred to as D3 in FIG. 6 thus represents the zone, within the block T5, over which the controlled vehicle is not required to slow down from the speed at which it enters block T5, so that it may continue to operate at normal, non-restricted speed. Therefore, when the vehicle to be controlled enters block T5 and drops detecting relay TR4, the relay XTAR is picked up (instead of relay 5TAR), over back contact 59 of relay TR4 and front contact 60 of relay TRX, to thereby cause modulation of the carrier frequency FX with tones calling for maintenance of the normal or non-restricted speed. However, as soon as the front end of the vehicle passes the temporary location point PX, it drops detection relay TRX, and, in accordance with the picking up of relay 5TAR (over back contact 61 of relay TRX and front contact 62 of relay TR5) the transmitter TX5 at the exit end of block T5 is then rendered effective to communicate the restricted speed control message to the vehicle; i.e. as soon as the head end of the vehicle passes the temporary location point, it would begin braking and would accordingly enter the zone D1 at the proper restricted speed.

In accordance with the foregoing discussion, it will be seen that the second embodiment of the present invention also provides for properly controlling railway vehicles to maintain a predetermined close, yet safe headway or spacing between them. In contrast to the first embodiment utilizing insulated track sections, however, this second embodiment provides this close headway control without requiring the use of insulated joints, in accordance with a control message sent to the vehicle comprising; (1) a predetermined number of valid (properly coded) carrier frequencies as indication that maximum safe braking distance exists in advance thereof, and (2) tone modulation of this carrier frequency information distinctive of the exact vehicle speed that is desired.

Having thus described two forms of railway vehicle control, as specific embodiments of the present invention, it is desired to be understood that these have been selected merely for the purpose of facilitating the disclosure rather than to limit the number of forms which the invention may assume; and, it is to be further understood that various modifications, adaptations and alterations may be applied to the specific forms shown, to meet the requirements of practice, without in any manner departing from the spirit or scope of the present invention.

What I claim is:

1. In a system for controlling railway vehicle traffic in a predetermined direction on a stretch of track divided into successive insulated track sections each having a length at least as great as the braking distance required to stop a vehicle travelling at a predetermined maximum speed, the combination of,
    (a) track circuit means for each of said sections for detecting whether or not a railway vehicle is occupying that section and including the track rails of said section for communicating predetermined control information to said vehicle distinctive of the desired performance of said vehicle on said track section,
    (b) first communication means including track coding apparatus associated with each track section responsive to the track circuit means for the next track section in advance effective to cause rate coded energization of the track rails of said associated track section with a first predetermined control code message informing a vehicle occupying said associated track section that it may operate on said associated track section at any speed up to and including said predetermined maximum speed, provided that said next track section in advance is unoccupied.
    (c) second communication means comprising a plurality of substantially evenly spaced high frequency transmitters connected to the track rails of each of the track sections and responsive to the spacing between two railway vehicles when they simultaneously occupy adjacent track sections for comunicating a second predetermined control message through the rails of the section occupied by the second or following of said vehicles informing said following vehicle as to whether it should accelerate or decelerate in accordance with whether the spacing to said preceding train is greater or less than a predetermined value respectively, and
    (d) means on said following vehicle including receiver means effective to inductively pick up said first and second communicated control messages from said track rails for registering the desired performance of said following vehicle in accordance with said received control messages.

2. The combination specified in claim 1 wherein said second communication means includes
    (a) a plurality of signal generator means disposed at predetermined spaced points along each track section, each of said generators being effective when said track section is occupied to apply to the rails of said section a signal of predetermined frequency different than that of the generator disposed at an adjacent point along said section and in the adjoining section,
    (b) signal repeating means effective when a particular track section is occupied by the trailing end of a first or leading vehicle to cause the signal frequency from each generator means that is disposed along said occupied section at a point behind the trailing end of said first vehicle to be repeated into the adjacent track section to the rear of said first vehicle by applying them to the rails of said adjacent track section at the exit end thereof, and
    (c) receiver means on the leading end of each vehicle effective to pick up each of the different frequency signals being applied to the track rails ahead of the vehicle, whereby a following or second vehicle operating in said adjacent track section to the rear of said first or leading vehicle receives a plurality of different frequency signals, the number of which is indicative of the space between the leading end of said following vehicle and the trailing end of said leading vehicle.

3. A system for controlling vehicle traffic in one direction along a stretch of railway track divided by insulated rail joints into successive track sections, each section having a length at least as great as the braking distance required to stop a vehicle travelling at a predetermined maximum speed comprising,
   (a) means for energizing the track rails including a plurality of distinctive high frequency transmitters connected to the track rails of each section at substantially evenly spaced intervals respectively,
   (b) said energizing means being normally effective to energize the track rails by the transmitters for the associated track sections only,
   (c) means responsive to the presence of a first vehicle in one of the track sections for by-passing the insulated joints separating the next track section in the rear to permit the energization of the track rails in said section in the rear by frequencies transmitted through the track rails of said one track section, and
   (d) receiving means on the leading end of each vehicle effective to pickup each of the different frequency signals being applied to the track rails ahead of the vehicle, whereby a following or second vehicle operating in said next track section in the rear of said first vehicle receives a plurality of different frequency signals, the number of which is indicative of the space between the leading end of the following vehicle and the trailing end of the first vehicle.

References Cited

UNITED STATES PATENTS

| | | | |
|---|---|---|---|
| 1,922,113 | 8/1933 | Sorensen | 246—63 |
| 2,698,377 | 12/1954 | Korman | 246—63 |
| 3,042,136 | 7/1962 | Havnen | 246—63 |

FOREIGN PATENTS 936,016  9/1963  Great Britain.

ARTHUR L. LA POINT, *Primary Examiner.*

S. T. KRAWCZEWICZ, *Assistant Examiner.*